(12) United States Patent
Bos et al.

(10) Patent No.: US 6,996,410 B2
(45) Date of Patent: Feb. 7, 2006

(54) METHOD AND BROADCAST MULTICAST SERVICE SERVER FOR DATA BROADCASTING IN THIRD GENERATION NETWORKS

(75) Inventors: Lieve Maria Marcella Rosemarijin Bos, Vlimmeren (BE); Adrianus Johannes Van Ewijk, Antwerp (BE); Laurent Jean André Thiebaut, Antony (FR)

(73) Assignee: Alcatel, Paris (FR)

( * ) Notice: Subject to any disclaimer, the term of this patent is extended or adjusted under 35 U.S.C. 154(b) by 366 days.

(21) Appl. No.: 10/601,857

(22) Filed: Jun. 24, 2003

(65) Prior Publication Data

US 2004/0087319 A1 May 6, 2004

(30) Foreign Application Priority Data

Jun. 25, 2002 (EP) .................................. 02291586

(51) Int. Cl.
*H04Q 7/20* (2006.01)

(52) U.S. Cl. .................. 455/466; 455/414.1; 455/445; 455/509; 455/515; 370/338

(58) Field of Classification Search .................... None
See application file for complete search history.

(56) References Cited

PUBLICATIONS

"3rd Generation Partnership Project; Technical Specification Group Services and System Aspects; Multimedia broadcast/Multicast Service; Architecture and Functional Description (Released 6) (3GPP TR 23.846 0.40.0") Internet Article, Jan. 2002, XP00222363.

*Primary Examiner*—Nguyen Vo
*Assistant Examiner*—Julie E Stein
(74) *Attorney, Agent, or Firm*—Sughrue Mion, PLLC

(57) ABSTRACT

A telecommunication network (TN) comprises a radio access network (2) defining cells in which user equipments (7) are localized and a core network (1) linked to the radio access network and adapted to establish a multimedia broadcast multicast context for the user equipments (7) located in the cells. It also comprises i) connecting means (16) arranged, when receiving a first request for broadcasting data to user equipments (7) localized in a broadcast area defined by at least one of the cells, to establish a first connection with the radio access network (2), and ii) requesting means (17) arranged, when the first connection is established, to send a second request to the core network (1), via the radio access network (2), in order the core network (1) establishes a second connection with the radio access network (2) for signalling with it, and, when the second connection is established, to send a third request to the core network (1), via the first and second connections, for establishment of a MBMS context, in order to activate a broadcast service for broadcasting the data to the user equipments (7) localized in the broadcast area.

27 Claims, 3 Drawing Sheets

Figure 1:
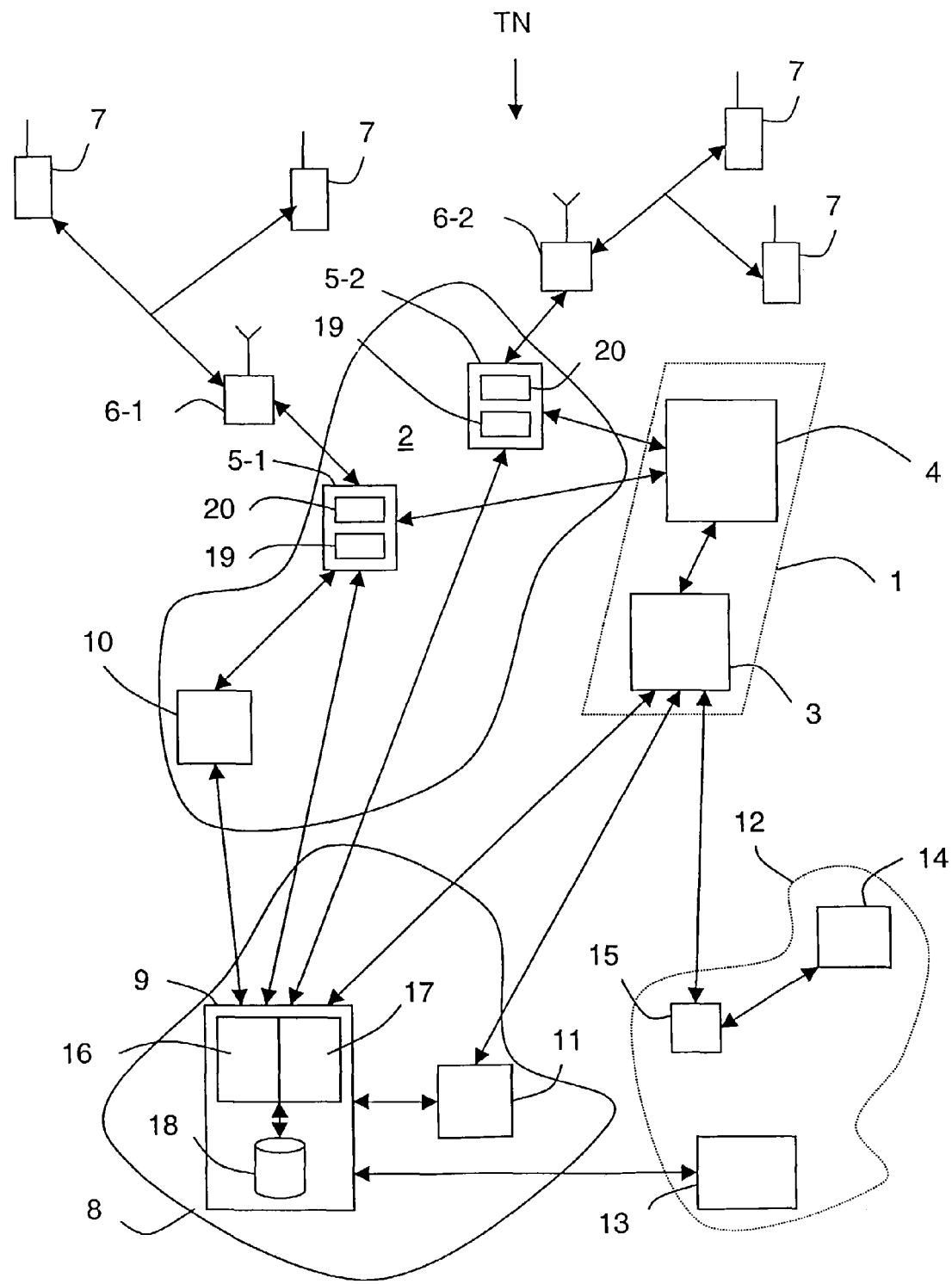

METHOD AND BROADCAST MULTICAST SERVICE SERVER FOR DATA BROADCASTING IN THIRD GENERATION NETWORKS

The present invention relates to telecommunication networks, and more particularly to data broadcasting and multicasting in networks such as GPRS and UMTS networks.

As it is known by one skilled in the art, in third generation (3G) networks, such as UMTS networks (which use the GPRS network transport capabilities with additional functionalities), multicast and broadcast services are available through a multimedia broadcast multicast service (or MBMS) managed by a broadcast multicast service centre (or BM-SC).

A "MBMS multicast service (or mode)" is a service in which a user requests or activates his participation in both home and roaming situations for sending multimedia data to several users. The multicast mode transmits the "source MBMS data" to the only cells of the multicast group or area in which at least one user equipment, such as a mobile telephone, has joined the multicast group. Depending on the number of user equipment that have joined the service, and possibly of the cell loading strategy, point-to-point radio channel or point-to-multipoint radio channel may be used.

A "MBMS broadcast service (or mode)" is a network initiated service that allows the network to send multimedia service data (or content) to users localized in a chosen geographical area (or broadcast area) in order said users enable or disable said multimedia service. The broadcast mode transmits the source MBMS data in all the cells of a specified broadcast area without knowing the user equipments that are localized in this area. Here, the BM-SC does not know the user equipment or its location for the MBMS broadcast, but it knows that the radio access network (or RAN) of the telecommunication network might, at least, know the user equipment. The MBMS service does not know that the user equipment is receiving broadcast data, and the network elements involved in the data transport might be aware that the user equipment is receiving the data. A point-to-multipoint radio channel must always be used at the radio interface of all cells.

These two types of services share a common feature: the multimedia data are provided in a "point-to-multipoint" way, or in other words multimedia data are transmitted from a single source entity (or network equipment) to multiple user equipments, such as mobile telephones.

3G networks comprise a core network including at least one service serving node (or SSN) connected to a radio access network (RAN) including radio network controllers (or RNCs) linked to emission/reception base station, such as Node-B in case of UMTS network, and controlling the radio resources and therefore the cells in which user equipments are localized. Despite common features, requirements for distribution (group based or area based) and activation (joining procedure or not) of MBMS broadcast and multicast modes, are different.

To deal with these different requirements the network specialists have developed complex solutions. This is more especially true in the broadcast mode for which the core network has to keep track of the cell locations of the user equipments. As a result, the SSNs need to be aware of the cell topology of the radio access network (RAN). For this purpose, either the BM-SC needs to provide the proper SSN for cell topology or the proper SSN is aware of the cell topology through Operation, Administration and Maintenance (or OAM) operations, and the proper SSN had to send the required cell topology through dedicated messages to the RAN in order the broadcast be accomplish. This infringes one of the key principles of the UMTS architecture according to which the core network is unaware of the cell topology of the RAN. Moreover, storing and handling of cell topology (or knowledge) in the core network is very costly in terms of CPU power and storage capacity.

The object of this invention is therefore to overcome all or part of the aforementioned drawbacks.

For this purpose, it provides a method of transmitting data between network equipments in a telecommunication network which comprises a radio access network (or RAN) defining cells in which user equipments, such as mobile telephones, are localized, and a core network linked to this radio access network and adapted to establish a multimedia broadcast multicast context (or MBMS) for the user equipments located in the cells.

The MBMS context is a special type of packet data protocol (or PDP) context or context information that is stored in the network elements, such as GGSN (or "gateway network serving node"), SSN (or SGSN), RNC and user equipment, that represent the link that said user equipment has with the GGSN, also named "session of a user equipment". All the network elements that have PDP context information relative to a certain user equipment know through this information how to route data packets, for example coming from/to the Internet, from GGSN to user equipment and vice versa. So, MBMS context or information represents all the routing information that are stored in the network entities (or elements), including the user equipment. Consequently, the MBMS service is the transport (or bearer) service that incorporates notably MBMS context(s), shared tunnels between network entities, shared radio channels and the BM-SC.

This method notably comprises the steps of:
transmitting a first (internal or external) request for broadcasting data to user equipments localized in a broadcast area defined by at least one of the cells, to a broadcast multicast service server or centre (BM-SC) of the telecommunication network,
establishing a first connection between the broadcast multicast service server and the radio access network,
sending a second request from the broadcast multicast service server to the core network, via the radio access network, to establish a second connection between the radio access network and the core network for signalling in between,
sending a third request, from the broadcast multicast service server to the core network, via the first and second connections, for establishment of a MBMS context, in order to activate (or initiate) a broadcast service for broadcasting the data to the user equipments localized in the broadcast area.

So, the broadcast multicast service server (or BM-SC) undertakes directly to activate a requested service to broadcast in a chosen cell in a similar way as user equipment does in multicast mode whereby existing messages are reused. Consequently, the transport of data to broadcast is done in a similar way as data to multicast. This allows to reuse point-to-point functionalities and messages and also the same functionalities and messages as those proposed for MBMS multicast, which notably eases implementation.

When i) the radio access network (RAN) comprises radio network controllers (or RNC) each connected to a base station to define cells in which user equipments are localized, and ii) the core network comprises at least one service serving node (or SSN), such as a service GPRS serving Node (or SGSN), linked to the radio network controllers and at least one gateway serving node, such as a gateway GPRS serving node (or GGSN), linked to the service serving node, the first connection is preferably established between the broadcast multicast service server (BM-SC) and each radio network controller (RNC) that controls at least one cell included in the broadcast area and that is named "chosen radio network controller". Hereby the second connection is established between the service serving node and each "chosen radio network controller". Furthermore the third request is send from the broadcast multicast service server over the first connection via the "chosen radio network controller" and further over the second connection to the service serving node.

The method according to the invention may include additional characteristics considered separately or combined and notably:

- a MBMS context part between the gateway serving node and the service serving node is preferably set up upon reception of said third request. This MBMS context part is advantageously a bearer path, such as a GTP tunnel; and
- furthermore the gateway serving node preferably sets up, upon set up of the above mentioned MBMS context part, a MBMS bearer between the gateway serving node and the broadcast multicast service server; this MBMS bearer being advantageously a bearer path, such as a TCP/IP session or an UDP/IP session;
- it can comprise, after the MBMS context part establishment and the bearer path establishment, an exchange of dedicated messages between the broadcast multicast service server, the radio network controllers and the service serving node, via the first and second connections, at least some of the dedicated messages comprising at least cell identifiers for designating each cell of the broadcast area in which data need to be broadcasted, in order to establish MBMS bearers for transporting the data to broadcast. In this case the MBMS bearers preferably comprise first MBMS bearer(s) between the service serving node and each of the radio network controllers and second MBMS bearers between each of the chosen radio network controllers and each user equipment localized in the cell it controls;
- the data to broadcast may be transported from the broadcast multicast service server, or from a content provider in the service center or in the content provider center via the broadcast multicast service server, to the user equipments, this via the gateway serving node, the service serving node and the chosen radio network controllers; or alternatively from a content provider server to the user equipments, via the gateway serving node, the service serving node and the chosen radio network controllers;
- the first MBMS bearers or the MBMS context part are preferably chosen in a group comprising GTP tunnels (or "GPRS Tunnelling Protocol" tunnels) and IP tunnelling protocol tunnels;
- at least one of the MBMS bearers, MBMS context part or said bearer path can be shared to transport the data up to the user equipment.

The invention also relates to a broadcast multicast service server (or centre) for a telecommunication network comprising a radio access network (or RAN) defining cells in which user equipments, such as mobile telephones, are localized, and a core network linked to this radio access network and adapted to establish a multimedia broadcast multicast context (or MBMS) for the user equipments located in the cells.

This server notably comprises:

- connecting means arranged, when receiving a first request for broadcasting data to user equipments localized in a broadcast area defined by at least one of said cells, to establish a first connection with the radio access network, and
- requesting means arranged, when the first connection is established, to send a second request to the core network, via the radio access network, to the core network in order this core network establishes a second connection with the radio access network for signalling with it, and, when the second connection is established, to send a third request to the core network, via the first and second connections, for establishment of a MBMS context, in order to activate a broadcast service for broadcasting the data to said user equipments localized in the broadcast area.
- It has to be remarked that this second request might be forwarded from the radio access network to the core network over a direct transfer mode link already established for other purposes. Hereafter the second connection is established between both i.e. the core network and the access network, by the core network. This second connection is especially dedicated to a 'user'. This 'user' is in this situation, according to the present invention, the broadcast service server.

The broadcast multicast service server according to the invention may include additional characteristics considered separately or combined and notably:

- the first connection is preferably established between the connection means and each chosen RNC that controls one cell included in the broadcast area, and the second connection is preferably established between the service serving node and each "chosen radio network controller". Furthermore the third request is send from the requesting means of the broadcast multicast service server over the first connection via the "chosen radio network controller" and further over the second connection to the service serving node; and
- a MBMS context part between the gateway serving node and the service serving node is preferably set up upon reception of said third request. This MBMS context part is advantageously a bearer path, such as a GTP tunnel; and
- upon set up of a MBMS context part, a MBMS bearer is preferably set up between the gateway serving node and the connection means of the broadcast multicast service server, this MBMS bearer being advantageously a bearer path, such as a TCP/IP session or an UDP/IP session;
- after the MBMS context part establishment and the bearer path establishment, the requesting means can be arrange to exchange dedicated messages including at least cell identifiers for designating each cell of the broadcast area in which data need to be broadcasted with the radio network controllers and the service serving node, via the first and second connections, in order to establish MBMS bearers for transporting the data to broadcast. In this case the MBMS bearers preferably comprise first MBMS bearer(s) between the service serving node and each of the radio network controllers and second MBMS bearers between each of the chosen radio network controllers and each user equipment localized in the cell it controls;

at least one of the MBMS bearers, MBMS context parts or said bearer paths can be shared to transport the data up to the user equipment;

the requesting means can be arranged to transmit received data to broadcast to the gateway serving node, in order these data be transported up to the user equipments via the service serving node and the chosen RNCs;

the requesting means of this broadcast multicast service server may be arranged, when at least two cells of the broadcast area have a coverage area at least partly identical, to select between these cells the most appropriated according to at least one chosen criterion. This chosen criterion could be made out of data transmitted to the broadcast multicast service server and coming from the same source as the data to be broadcasted. Such a source may be, for example, a content provider server. Moreover, this criterion is preferably chosen in a group comprising at least broadcasting cost, level priority and congestion status.

The invention also relates to a radio network controller (RNC) for a radio access network of a telecommunication network, this radio network controller being linkable to a core network of the telecommunication network adapted to establish a multimedia broadcast multicast service context for user equipments, and comprising:

i) first forwarding means arranged to receive a second request sent by a broadcast multicast service server of the above-described type on a first connection and to forward this second request over a direct transfer mode link to a service serving node of the core network after which this service serving node establishes a second connection with the radio network controller; and ii) second forwarding means arranged to receive a third request send by the broadcast multicast service server and to forward this third request to the service serving node.

The invention also relates to a telecommunication network, such as a UMTS or GPRS network, which comprises i) a radio access network (RAN) defining cells in which user equipments, such as mobile telephones, are localized; and ii) a core network linked to this radio access network and adapted to establish a multimedia broadcast multicast context (MBMS) for the user equipments located in the cells, and iii) at least one broadcast multicast service server of the above-described type. The radio access network of this telecommunication network can also comprises at least one radio network controller of the above-described type.

It is also possible to provide the telecommunication network with a cell broadcast centre (or CBC) in order to establish the first connection between the broadcast multicast service server and the chosen RNC.

The invention may be advantageously implemented with a first connection such as TCP/IP, IPsec, UDP/IP or ATM connection, and more particularly when the second and third requests are send through the first and second connections according to a protocol such as RANAP (or "Radio Access Network Application Protocol") or SABP (or "Service Area Broadcast Protocol") or else all similar protocols used in 3G networks or 2G networks, such as GSM network.

Figure 2:
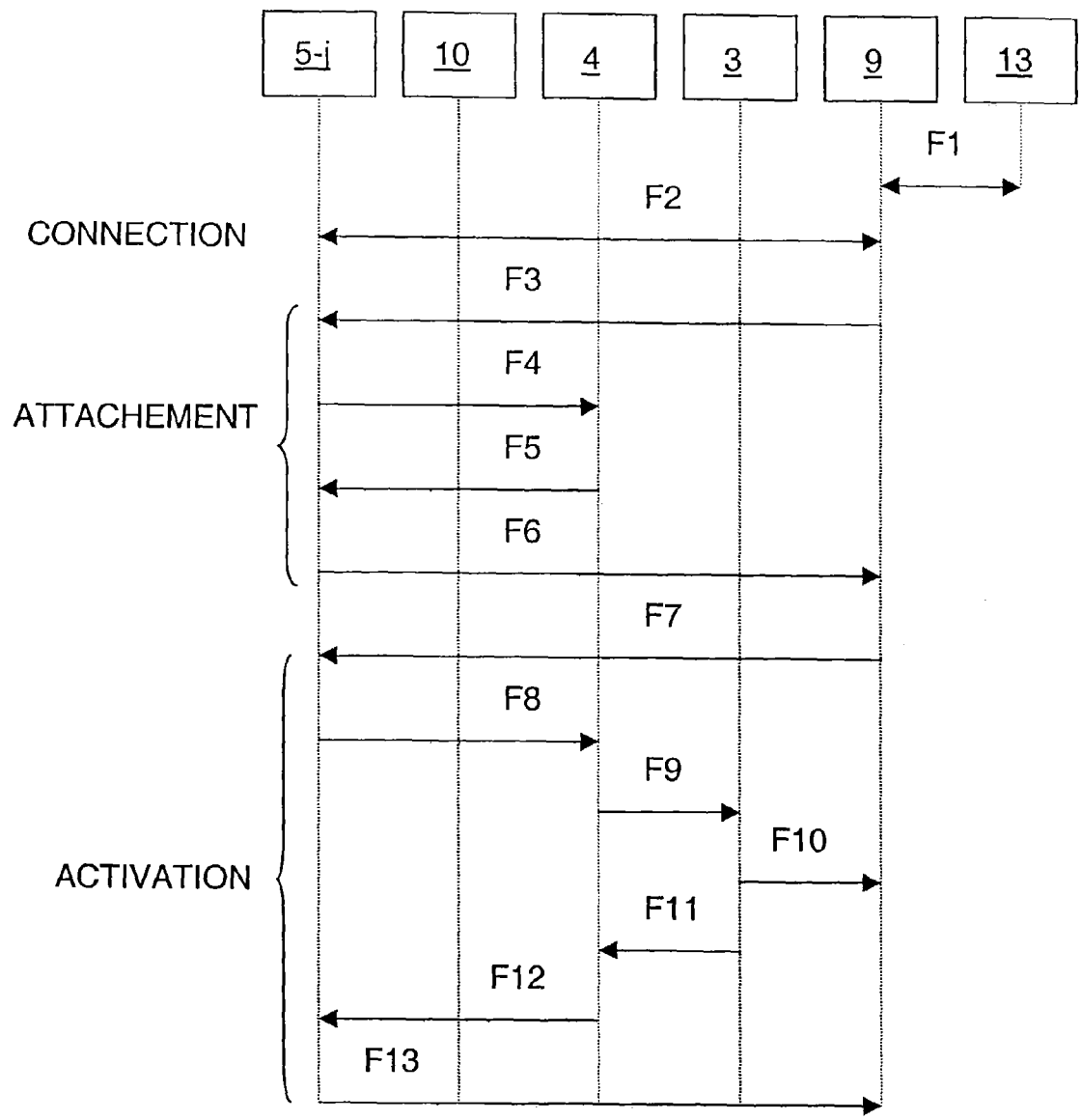
Figure 3:
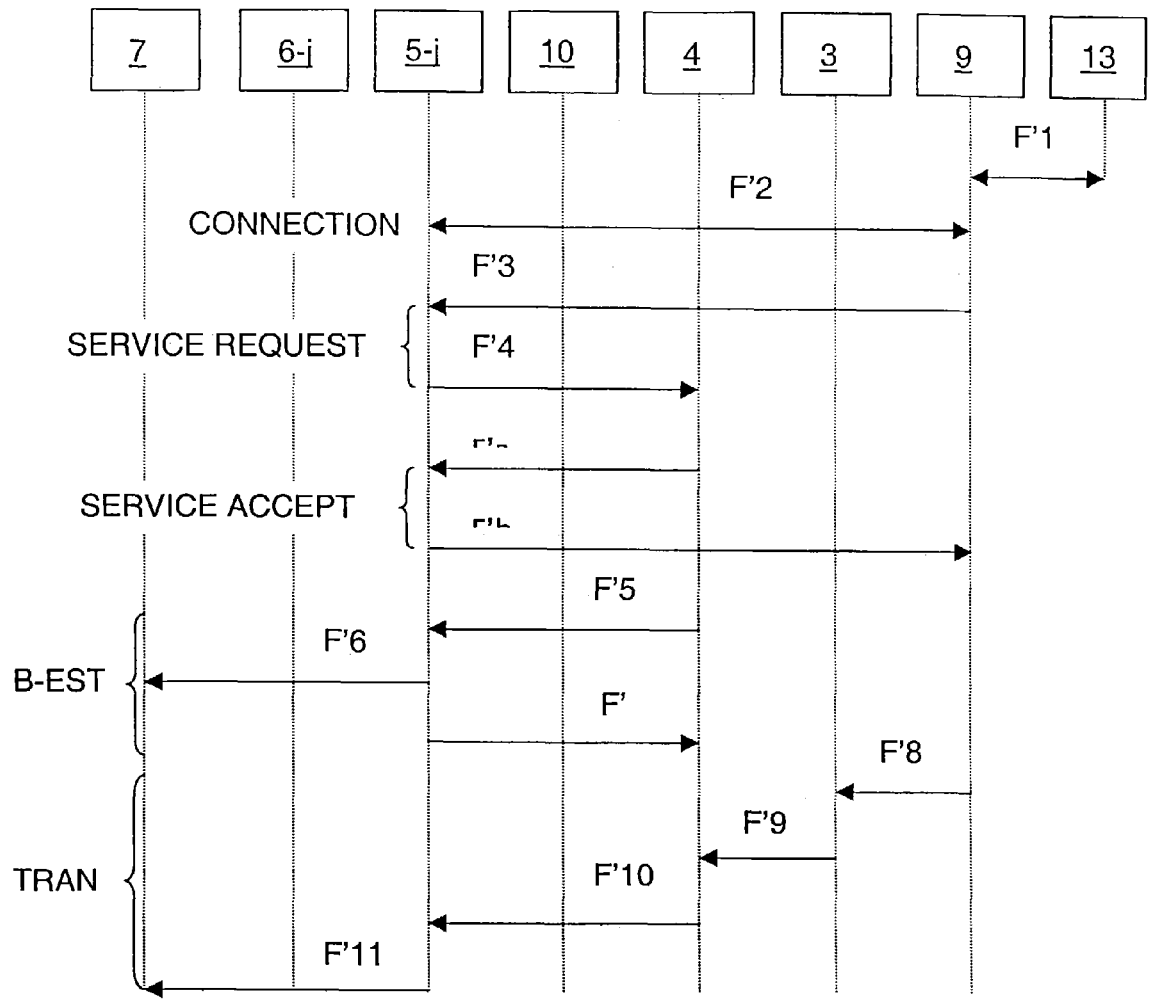

Other features and advantages of the invention will become apparent on examining the detailed specifications hereafter and the appended drawings, wherein:

FIG. 1 schematically illustrates a telecommunication network according to the invention, FIG. 2 is a diagram illustrating an example of procedure of service or context activation for MBMS broadcast mode, FIG. 3 is a diagram illustrating an example of procedure of setup of MBMS data transfer at service initiation.

The appended drawings, have essentially a definite character. Accordingly, they may not only serve to complete the invention, but also to contribute to its definition, if need be.

Reference is initially made to FIG. 1 in order to describe a telecommunication network according to the invention, in a non-limiting embodiment.

The telecommunication network TN is preferably adapted to mobile telephony. It is preferably a third generation (3G) network, and more preferably a UMTS network. But it could be another type of network such as a GPRS network (2,5G). UMTS network is well known by those skilled in the art, so it will not be described in detail. To sum up, this network TN comprises a core network 1 linked to a radio access network (or RAN) 2. The core 30 network 1 comprises a gateway serving node 3, such as a GGSN, linked to at least one service serving node 4, such as a SGSN. In this example, the GGSN 3 is linked to only one service serving node 4, but it could be link to a plurality of such service serving nodes.

The radio access network 2 comprises a plurality of j radio network controllers (or RNCs) 5-j, each linked to at least one base station 6-j to define one or more telecommunication cells. Moreover each RNC 5-j is linked to the service serving node 4. In the example illustrated in FIG. 1 there are only two RNCs 5-1 and 5-2 linked to the service serving node 4. A base station 6-j, which is named Node-B in case of a UMTS network, can establish a connection with a user equipment 7-k (or mobile telephone) when it is localized inside its emission/reception coverage area.

The telecommunication network TN also comprises a service centre 8 dedicated to broadcast and multicast services. In the UMTS network data multicast and broadcast services are available through a multimedia broadcast multicast service or MBMS. The main goal of MBMS is to optimize transport of multimedia data in both the core network 1 and the radio access network (RAN) 2 of the UMTS network for broadcast and multicast services. The multimedia data are in principle sent only once on every link established between "boxes" in the path extending from the MBMS data source to a user. In other words, data coming from a broadcast multicast service centre or server 9 (or BM-SC, described below) are sent only once on every link involving the service, for example a GTP tunnel, between the BM-SC 9 and the GGSN 3, then between the GGSN 3 and the SGSN 4 and finally between the RNC 5-j and the user equipment 7.

As it is known by the one skilled in the art MBMS foresees two modes of operation: a broadcast mode and a multicast mode.

The MBMS multicast mode is a service in which a user requests or activates its participation. The user can request from the network its participation in both home and roaming situations for sending multimedia data to several users.

The MBMS broadcast mode is a network initiated service. The network sends multimedia service data (or content) to users localized in a chosen geographical area (for example one or more cells), in order said users enable or disable said multimedia service.

These two modes are classically managed by a server 9 named broadcast multicast service centre or BM-SC by the one skilled in the art. This BM-SC 9 and its main functionalities are notably described in the document "3GPP-TR 23.846".

This BM-SC 9 is settled in the service centre 8. As it will be described below, the BM-SC 9 is arranged to establish specific connection with the gateway serving node (GGSN)

3 and the RNCs 5-*j* either directly or via a cell broadcast server 10, also named "cell broadcast centre" (or CBC).

As illustrated in FIG. 1, the service centre 8 may also comprise a second server (or content server) 11 for storing information and especially MBMS data, linked to the gateway serving node (GGSN) 3 and to the BM-SC 9. Usually the content server 11 belongs to the mobile network operator.

Finally the telecommunication network TN comprises a "content provider centre" 12 equipped with a content provider broadcast service server 13, linked to BM-SC 9, and at least one content provider server 14, which usually belongs to a third person, linked to the gateway serving node (GGSN) 3 via one or two border routers 15.

As mentioned above, in the standard MBMS broadcast mode the core network 1 needs to keep track of the cell location of each user equipment 7. For this purpose either the BM-SC 3 needs to provide the proper SGSN 4 for cell topology or the proper SGSN 4 is aware of the cell topology through Operation and Maintenance (or OAM) operations and must send the required cell topology through dedicated messages to the RAN 3 in order the broadcast be accomplished. This infringes one of the key principles of the UMTS architecture according to which the core network is unaware of the cell topology of the RAN. Moreover this is costly in terms of CPU power and storage capacity.

According to the invention the BM-SC 9 is arranged in order to operate as a user equipment 7 when requesting MBMS service (de-)activation to the proper service serving node (SGSN) 4. So, the well known procedure used for MBMS multicast mode can also be used for MBMS broadcast mode. It means that BM-SC 9 will request the transmission of MBMS broadcast data in chosen cell(s), which will only be known by the RAN 3 and the BM-SC itself, and the transport of MBMS data will be done in a similar way as in MBMS multicast mode. So it becomes possible to reuse point-to-point functionalities and messages, which notably eases implementation of the MBMS architecture.

For this purpose, and as illustrated in FIG. 1, when the BM-SC 9 receives a broadcasting request, it establishes a (first) connection with the RNC(s) 5-*j* that control(s) the cell(s) in which the broadcast must be performed for signalling with the SGSN 4 associated to this RNS 5-*j*.

The broadcasting request can be internal or external. It may be a MBMS request accompanied with the data to broadcast or only data to broadcast. This broadcasting request and/or the data to broadcast can come from different MBMS data sources, such as the content server 11 which usually belongs to the mobile network operator (internal request), or the content provider broadcast service server 13 (external request), or else the content provider server 14 (external request). So, when the broadcasting request comprises the data to broadcast, the BM-SC 9 stores them in a memory 18 before establishing the first connection.

This first connection is managed by a connection modulus 16 of the BM-SC, and is preferably of the TCP/IP type, but it may be also of the IPsec type or UDP/IP type or else based on ATM technology. This first connection may be provided directly between the BM-SC 9 and the proper RNC 5-*j* or via the cell broadcast centre (CBC) 10. Every existing signalling method may be used for signalling between the BM-SC 9 and the RNC 5-*j* and between the RNC 5-*j* and the SGSN 4. It could be for example the RANAP protocol (TS25.413) or the SABP protocol (TS25.419) or else all similar protocols used in 3G networks or 2G networks, such as GSM networks. The connection modulus 16 of the BM-SC constitutes an interface that supports the chosen signalling protocol.

Then the BM-SC 9 must activate (or initiate) a MBMS broadcast service. For this purpose it needs to be known by the proper SGSN 4 that serves the RNC(s) 5-*j* that control(s) the chosen cell(s) (or broadcast area). So, it begins with an attachment procedure to the proper SGSN 4 via the established first connection and a direct transfer mode link. This attachment procedure is initiated by a requesting modulus 17 of the BM-SC 9 and managed by said requesting modulus 17 and a first forwarding modulus 19 of each RNC 5-*j*. The first forwarding modulus 19 forwards the initiation of the attachment procedure i.e. the second request, to the SGSN4. The SGSN4 receives this initiation of the attachment procedure and establishes the second connection between the RNC(s) 5-*j* and itself. The attachment procedure is followed by a context activation based on a request by the BM-SC 9 of settlement (or activation) of a MBMS context by the proper SGSN 4, via the established first connection and a second connection established with the proper SGSN 4 by the first forwarding modulus 19 upon reception of said attachment request.

This context activation is initiated by the requesting modulus 17 of the BM-SC 9 and managed by said requesting modulus 17 and a second forwarding modulus 20 of each RNC 5-*j*. More precisely this second forwarding modulus 20 is arranged to forward the MBMS context request to the proper SGSN 4 when it is received by its RNC 5-*j*.

The connection modulus 16, the requesting modulus 17, and the first 19 and second 20 forwarding modulus are preferably software modulus, respectively, but they may be also respectively made of electronic circuit(s) or hardware modulus, or a combination of hardware and software modulus.

Preferably, the settlement of MBMS context is based i) on establishment of MBMS bearers, such as GTP tunnels (or "GPRS Tunneling Protocol" tunnels), between the proper service serving node (SGSN) 4 and the gateway serving node (GGSN) 3, and ii) exchange of service membership join messages between the GGSN 3 and the BM-SC 9 to establish a bearer path in between.

When the MBMS context is established, the BM-SC 9 can request the initiation of the MBMS service. It results in establishment of MBMS bearers, such as GTP tunnels, between the proper SGSN 4 and the RNC(s) 5-*j* and between the RNC(s) 5-*j* and the user equipments 7 localized in the cell(s) it (they) control(s), for data transport. The MBMS bearers between the SGSN 4 and the RNC(s) 5-*j* are usually named "GTP tunnels", while a MBMS bearer between a RNC 5-*j* and a user equipment 7 is usually named "radio bearer". Some or all these GTP tunnels and radio bearers may be shared.

The requesting modulus 17 of the BM-SC 9 may also be arranged to deal with common coverage area between two or more chosen cells. This may occur in the presence of layered cell coverage with basic and umbrella cells, for example provided by a satellite broadcast system.

For this purpose, the requesting modulus 17 can select the most appropriated cell(s) according to one or more chosen criterions (or target area requirement(s)). The chosen criterion(s) may be permanent one(s). But a criterion is preferably made of data transmitted to the broadcast multicast service server 9 and coming from the same MBMS data source (13 or 14) that the data to broadcast. Moreover, a criterion is preferably chosen in a non-limiting group comprising at least broadcasting cost, level priority and congestion status.

Now reference is made to FIGS. 2 and 3 for describing in more details, but in a non-limiting example, the above-mentioned procedures or steps of connection establishment, attachment, context activation, service request, MBMS bearer establishment and data transport.

As illustrated in FIG. 2, a process starts, for example, when the content provider broadcast service server 13 sends to the BM-SC 9 a MBMS request for broadcasting data in one or several cells controlled by one or several RNCs 5-j and/or data to broadcast in one or several cells controlled by one or several RNCs 5-j (arrow F1). As above-mentioned, the broadcasting request and/or the data to broadcast may come from different MBMS data sources. A long term service announcement may precede this sending of MBMS request and/or data to broadcast. This announcement may be based on a http message, an e-mail message, a SMS message, a web-page or a SAP message, for example, send by the BM-SC 9 to the chosen user equipments 7.

The process follows with a connection procedure (materialized by arrow F2). During this procedure, the connection modulus 16 of the BM-SC 9 establishes a first connection with the RNC(s) 5-j that controls the cell(s) designated in the MBMS request and/or data received. This first connection is established either directly between the BM-SC 9 and the proper RNC 5-j or via the cell broadcast centre (CBC) 10. As above-mentioned, the first connection is preferably of the TCP/IP type. Moreover, the designated RNC(s) 5-j preferably perform(s) proxy function.

Then the process follows with an attachment procedure (materialized by arrows F3 to F6). During this procedure, the requesting modulus 17 of the BM-SC 9 sends an attachment request to each designated RNC(s) 5-j via the established first connection (arrow F3). Preferably, the attachment request specifies a temporary identifier such as the temporary mobile group(s) IMSI (or TMGI). Then each designated RNC 5-j "proxies" the attachment request to its associated service serving node (SGSN) 4, via a direct transfer mode link (arrow F4). Upon reception of this request the service serving node (SGSN) 4 establishes the second connection. The forwarding of the attachment request to said proper SGSN 4 is managed by the first forwarding modulus 19 of the RNC(s) 5-j; and the establishment of the second connection between the proper SGSN 4 and the RNC 5-j is managed by the proper SGSN4.

When the attachment is accepted by the SGSN 4, it sends to the BM-SC 9 an attachment accept message specifying the temporary identifier (TMGI), via the designated RNC 5-j (arrows F5 and F6).

As above-mentioned, the exchange of request and message between the BM-SC 9 and the RNC 5-j and between the RNC 5-j and the proper SGSN 4, via the established connection and link (or first and second connections), is based on a signalling method that uses preferably the RANAP protocol (TS25.413).

Then the process follows with a context activation procedure (materialized by arrows F7 to F13). During this procedure, the requesting modulus 17 of the BM-SC 9 sends an activation MBMS context request to the proper SGSN 4 via each designated RNC(s) 5-j (arrows F7 and F8 i.e. the third request). More precisely, the activation MBMS context request is received in the RNC 5-j and forwarded by its second forwarding modulus 20 to the proper SGSN 4 via the second connection (or link). Preferably, this request specifies an IP multicast address, a MBMS APN identifier (or "Access Point Identifier") and a NSAPI identifier (or "Network layer Service Access Point Identifier"), both known to BM-SC 9 through OAM operations. The APN is an identifier that identifies a type of service such as MBMS. When a SGSN 4 receives such an APN, it knows what kind of service is requested and therefore which GGSN 3 (that supports this service) must be contacted. The NSAPI is an identifier that allows a user equipment 7 to recognize a PDP/MBMS context. Also preferably, the designated RNC(s) 5-j preferably perform(s) proxy function. Upon reception of this request, the proper SGSN 4 sends a creation MBMS context request to the GGSN 3 based on the received APN identifier, in order it creates a MBMS context and establishes a MBMS bearer (preferably a GTP tunnel) with said SGSN 4 (arrow F9).

If the request sent by SGSN 4 is the first received by the GGSN 3, this GGSN 3 sends a MBMS service join message to the BM-SC 9 in order to setup a bearer path in between allowing the GGSN 3 to join the MBMS session provided by said BM-SC 9 (arrow F10). Then the GGSN 3 sends a creation MBMS context response to the SGSN 4 to confirm the establishment of the GTP tunnel (or MBMS bearer) in between (arrow F11).

Upon reception of this response the SGSN 4 sends an activation MBMS context accept message to the BM-SC 9, preferably specifying the TMGI and NSAPI identifier for acknowledgement recognition, via the established link between itself and the designated RNC(s) 5-j (arrow F12) and the established connection between the RNC(s) 5-j and the BM-SC 9 (arrow F13).

Then a data transfer process may be initiated on request of the BM-SC 9. A non-limiting example of this data transfer process is illustrated in details in FIG. 3.

The process starts when the content provider broadcast service server 13 sends to the BM-SC 9 a MBMS request for broadcasting data in one or several cells controlled by one or several RNCs 5-j and/or data to broadcast in one or several cells controlled by one or several RNCs 5-j (arrow F'1). The process follows with a (re-)connection procedure (arrow F'2). During this procedure, the connection modulus 16 of the BM-SC 9 (re-)establishes a connection with the RNC(s) 5-j that control(s) the cell(s) designated in the MBMS request or data received.

Then the process follows with a service request procedure (materialized by arrows F'3 and F'4). During this procedure, the requesting modulus 17 of the BM-SC 9 sends a service request to the designated RNC(s) 5-j, preferably specifying the relevant TMGI and RAI (or "Routing Area Identifier"; it indicates to the SGSN 4 which RNC(s) is (are) involved in the service), and the identifiers of the chosen cell(s) (arrow F'3). Upon reception of this service request the RNC(s) 5-j then proxy the service request to its associated service serving node (SGSN) 4, via the link (arrow F'4), specifying the TMGI, RAI and cell identifier(s).

Then the process preferably follows with a service accept procedure (materialized by arrows F'a and F'b in FIG. 2). During this procedure, the service serving node (SGSN) 4 sends a service accept to the designated RNC(s) 5-j, preferably specifying the relevant TMGI (arrow F'a). Upon reception of this service accept the RNC(s) 5-j then proxy the service request to the requesting modulus 17 of the BM-SC 9, via the link (arrow F'b), specifying the TMGI.

Then the process follows with a MBMS radio access bearer establishment procedure (materialized by arrows F'5 to F'7 and "B-EST"). During this procedure, the proper SGSN 4 sends a radio access bearer assignment request to the designated RNC(s) 5-j preferably specifying the NSAPI, the RABID(S) (or "Radio Access Bearer Identifier(s)"), TEID(s) (or "Tunnel Endpoint Identifier"), a QoS (or "Quality of Service"), the cell identifier(s) and its SGSN IP address (arrow F'5). The TEID is used in the GTP protocol to identify a MBMS context. It is put in the data packets that are routed through the mobile network, in order the receiving boxes of the data packets can recognize the MBMS context said data packets belong to. Upon reception of this request, each designated RNC 5-j sends a notification, preferably through RRC ("Radio Resource Control"), to the user equipments 7 localized in the cells specified in the radio access bearer assignment request in order said user equipments decide to receive or not the proposed service (arrow F'6). The RRC is a protocol used to talk to the user equipment 7 and to send the user equipment system information, such as the radio channel to listen to. Then each RNC 5-j sends MBMS radio access bearer assignment response messages to the proper SGSN 4 to finalize the radio access bearer (RAB) establishment in between (arrow F'7). One or several of these RABs may be shared.

When the MBMS radio access bearer establishment has been completed, a data transfer procedure can begin (materialized by arrows F'8 to F'11 and "TRAN"). Different transfer paths may be envisaged according to the MBMS data source. For example, if the data to broadcast are stored in the memory 18, or in the content server 11, or else in the content provider broadcast service server 13, the requesting modulus 17 of the BM-SC 9 extracts the MBMS data to broadcast (or MBMS PDP PDU (PDP stands for "Packet Data Protocol" and PDU stands for "Packet Data Unit")), from the MBMS data source and sends them to the GGSN 3, through an IP protocol, via the bearer path previously established (arrow F'8). Then the GGSN 3 sends the MBMS PDP PDU to the SGSN 4 via the established GTP tunnel (arrow F'9), and the SGSN 4 sends the received MBMS PDP PDU to the RNC(s) 5-j via the established GTP tunnel (arrow F'9). Finally the RNC(s) 5-j sends the received MBMS PDP PDU, via the established radio access bearers and preferably through PDCP (or "Packet Data Control Protocol"), to the user equipments 7 localized in the cell it controls and having accepted the service (arrow F'11).

In another example, if the data to broadcast are stored in a content provider server that is only linked to the GGSN 3, such as the server 14, the requesting modulus 17 of the BM-SC 9 send a message designating the content provider server 14 to the GGSN 3 in order it extracts the MBMS data to broadcast (or MBMS PDP PDU) from said server 14, preferably through an IP protocol. Then the GGSN 3 sends the MBMS PDP PDU to the SGSN 4 via the established GTP tunnel (arrow F'9), and the SGSN 4 sends the received MBMS PDP PDU to the RNC(s) 5-j via the established GTP tunnel (arrow F'9). Finally the RNC(s) 5-j sends the received MBMS PDP PDU, via the established radio access bearers and preferably through PDCP (or "Packet Data Control Protocol"), to the user equipments 7 localized in the cell it controls and having accepted the service (arrow F'11).

Other examples are possible. Especially, instead of sending a message to the GGSN 3 in order it extracts data to broadcast in a MBMS data source, the BM-SC 9 can send a message to the source in order it transmits its data to broadcast to the GGSN 3.

The invention also relates to a method (or process) of transmitting data between networks equipments in a telecommunication network comprising a radio access network (RAN) 2 defining cells in which user equipments 7 are localized, and a core network 1 linked to this radio access network 2 and adapted to establish a multimedia broadcast multicast context (MBMS) for the user equipments 7 located in the cells.

This method (or process) can be implemented by means of the telecommunication network TN and the broadcast multicast service server (BM-SC) 9 above-described. The main and optional functionalities and sub-functionalities provided by the steps or procedures of this method being approximately identical with those provided by the means that constitute the telecommunication network and the broadcast multicast service server, only the steps that implement the main functionalities of the method according to the invention will be resumed hereafter.

This method notably comprises the steps of:
transmitting a first (internal or external) request for broadcasting data to user equipments 7 localized in a broadcast area defined by at least one of the cells, to a broadcast multicast service server or centre (BM-SC) 9 of the telecommunication network TN,
establishing a first connection between the broadcast multicast service server 9 and the radio access network 2,
sending a second request from the broadcast multicast service server 9 to the core network 1, via the radio access network 2, to establish a second connection between the core network 1 and the radio access network 2 for signalling in between,
sending a third request, from the broadcast multicast service server 9 to the core network 1, via the first and second connections, for establishment of a MBMS context, in order to activate (or initiate) a broadcast service for broadcasting the data to the user equipments 7 localized in the broadcast area.

Thanks to the invention, the cell knowledge is centralized in the broadcast multicast service centre (BM-SC) which ensures that the service serving node 4 does not have to be aware of the cell topology of the radio access network (RAN), and therefore that the key principle of the 3G network architecture, and especially UMTS architecture, is maintained. So, costly extra storage, handling of cell topology and OAM operations by the service serving node can be avoided.

Furthermore it has to be remarked that in the event of releasing the broadcast service, also the attachment and the establishment of the MBMS context and accompanying bearers are to be released in a similar way e.g. the de-activation of the MBMS context by broadcast multicast service center (9). Moreover, as for broadcast mode the BM-SC activates the MBMS service in a similar way as user equipment does for multicast mode, a simplified mono-architecture can be defined for both broadcast and multicast modes of MBMS, reusing 3G existing functionalities and messages.

The invention is not limited to the embodiments of telecommunication network, broadcast multicast service server and method described above, only as examples, but it encompasses all alternative embodiments which may be considered by one skilled in the art within the scope of the claims hereafter.

So, it has been described a telecommunication network comprising a core network including only one gateway serving node linked to only one service serving node. But the invention also applies to a telecommunication network comprising a core network including only one gateway serving node linked to several service serving nodes, or to a core network including several gateway serving nodes linked to one or several service serving nodes.

Moreover, it has been described a 3G telecommunication network of the UMTS type. But this telecommunication network could be a 2,5G telecommunication network of the GPRS type.

More, the invention also applies i) to wireless local area networks (or WLANs) that are connected to a 3G telecommunication network, and ii) to a fixed IP network, in which a connection can be established with a router connected to a local area network (or LAN). In this case, a box of the BM-SC type could ask the router to join a multicast/broadcast session, in order this router, after receiving the multicast/broadcast data, forwards or sends them in the LAN.

What is claimed is:

1. A method of transmitting data between network equipments in a telecommunication network comprising a radio access network (2) defining cells in which user equipments (7) are localized and a core network (1) linked to said radio access network and adapted to establish a multimedia broadcast multicast context, named "MBMS context", for said user equipments (7) located in said cells, characterized in that it comprises the steps of:

transmitting a first request for broadcasting data to user equipments (7) localized in a broadcast area defined by at least one of said cells, to a broadcast multicast service server (9) of said telecommunication network, establishing a first connection between said broadcast multicast service server (9) and said radio access network (2), sending a second request from said broadcast multicast service server (9) to said core network (1), via said radio access network (2), to establish a second connection between said radio access network (2) and said core network (1) for signalling in between, sending a third request, from said broadcast multicast service server (9) to said core network (1), via said first and second connections, for establishment of a MBMS context, in order to activate a broadcast service for broadcasting said data to said user equipments (7) localized in said broadcast area.

2. Method according to claim 1, wherein said radio access network (2) comprises radio network controllers (5-j) each connected to a base station (6) to define said cells, and said core network (1) comprises at least one service serving node (4) linked to said radio network controllers (5-j) and at least one gateway serving node (3) linked to said service serving node (4), wherein said first connection is established between said broadcast multicast service server (9) and each radio network controller (5-j) controlling a cell included in said broadcast area and named "chosen radio network controller (5-j)", and wherein said second connection is established between said service serving node (4) and each said "chosen radio network controller (5-j)", whereby said third request is send from said broadcast multicast service server (9) over said first connection via said "chosen radio network controller (5-j)" and further over said second connection to said service serving node (4).

3. Method according to claim 2, where by said service serving node (4), upon reception of said third request, sets up an MBMS context part between said gateway serving node (3) and said service serving node (4).

4. Method according to claim 3, wherein said gateway serving node (3) sets up, upon set up of said MBMS context part, a bearer path between said gateway serving node (3) and said broadcast multicast service server (9).

5. Method according to claim 2, wherein it comprises, after said MBMS context part set up and said bearer path set up an exchange of dedicated messages between said broadcast multicast service server (9), said radio network controllers (5-j) and said service serving node (4), via said first and second connections, at least some of said dedicated messages comprising at least cell identifiers for designating each cell of said broadcast area in which data need to be broadcasted, in order to establish MBMS bearers for transporting said data to broadcast.

6. Method according to claim 5, wherein said MBMS bearers comprise first MBMS bearer(s) between said service serving node (4) and each of said chosen radio network controllers (5-j) and second MBMS bearers between each of said chosen radio network controllers (5-j) and each user equipment (7) localized in the cell it controls.

7. Method according to claim 5, wherein said data to broadcast are transported from said broadcast multicast service server (9) to said user equipments (7) via said gateway serving node (3), said service serving node (4) and said chosen radio network controllers (5-j).

8. Method according to claim 5, wherein said data to broadcast are transported from a content provider server (14) to said user equipments (7) via said gateway serving node (3), said service serving node (4) and said chosen radio network controllers (5-j).

9. Method according to claim 6, wherein anyone of said first MBMS bearers and said MBMS context parts, is chosen in a group comprising GTP tunnels and IP tunnels.

10. Method according to claim 5, wherein at least anyone of said MBMS bearers, MBMS context parts and said bearer paths, is shared for broadcasting said data to said user equipment (7).

11. Use of the method, broadcast multicast service server (9), radio network controller (5-j) and telecommunication network (TN) according to claim 1, wherein said first connection is chosen in a group comprising TCP/IP, IPsec, UDP/IP, Transport Layer Security TLS and ATM connection.

12. Use according to claim 11, wherein said second and third requests are send through said first and second connections according to a protocol chosen in a group comprising RANAP and SABP.

13. Broadcast multicast service server (9) for a telecommunication network comprising a radio access network (2) defining cells in which user equipments (7) are localized and a core network (1) linked to said radio access network and adapted to establish a multimedia broadcast multicast context for said user equipments (7) located in said cells, characterized in that it comprises i) connecting means (16) arranged, when receiving a first request for broadcasting data to user equipments (7) localized in a broadcast area defined by at least one of said cells, to establish a first connection with said radio access network (2), and ii) requesting means (17) arranged, when said first connection is established, to send a second request to said core network (1), via said radio access network (2), in order said core network (1) establishes a second connection with said radio access network (2) for signalling with it, and, when said second connection is established, to send a third request to said core network (1), via said first and second connections, for establishment of a MBMS context, in order to activate a broadcast service for broadcasting said data to said user equipments (7) localized in said broadcast area.

14. Broadcast multicast service server (9) according to claim 13, wherein said radio access network (2) comprises radio network controllers (5-j) each connected to a base station (6) to define said cells, and said core network (1) comprises at least one service serving node (4) linked to said radio network controllers (5-*j*) and at least one gateway serving node (3) linked to said service serving node (4), wherein said first connection is established between said connection means (16) and each radio network controller (5-*j*) controlling a cell included in said broadcast area and named "chosen radio network controller (5-*j*)", and wherein said second connection is established between said service serving node (4) and each said "chosen radio network controller (5-*j*)",.whereby said third request is send from said requesting means (17) over said first connection via said "chosen radio network controller (5-*j*)" and further over .said second connection to said service serving node (4).

15. Broadcast multicast service server (9) according to claim 14, wherein, upon reception of said third request, said service serving node (4) sets up an MBMS context part between said gateway serving node (3) and said service serving node (4).

16. Broadcast multicast service server (9) according to claim 15, wherein upon set up of said MBMS context part, said gateway serving node (3) sets up a bearer path between said gateway serving node (3) and said connection means (16).

17. Broadcast multicast service server (9) according to claim 14, wherein said requesting means (17) is arranged, after said MBMS context set up and said bearer path set up, to exchange dedicated messages including at least cell identifiers for designating each cell of said broadcast area in which data need to be broadcasted with said radio network controllers (5-*j*) and said service serving node (4), via said first and second connections, in order MBMS bearers be established for transporting said data to broadcast.

18. Broadcast multicast service server (9) according to claim 17, wherein said requesting means (17) is arranged to transmit received data to broadcast to said gateway serving node (3), in order said data be transported up to said user equipments (7) via said service serving node (4) and said chosen radio network controllers (5-*j*).

19. Broadcast multicast service server (9) according to claim 13, wherein said requesting means (17) is arranged, when at least two cells of said broadcast area have a coverage area at least partly identical, to select between said cells the most appropriated cell(s) according to at least one chosen criterion.

20. Broadcast multicast service server (9) according to claim 19, wherein said chosen criterion is made of data transmitted to said server (9) and coming from a same source that said data to broadcast.

21. Broadcast multicast service server (9) according to claim 19, wherein said criterion is chosen in a group comprising at least broadcasting cost, level priority and congestion status.

22. Radio network controller (5-*j*) for a radio access network (2) of a telecommunication network (TN), said radio network controller being linkable to a core network (1) of said telecommunication network (TN) adapted to establish a multimedia broadcast multicast context for user equipments (7), characterized in that it comprises:

i) first forwarding means (19) arranged to receive a second request sent by a broadcast multicast service server (9) according to claim 13 on a first connection; and arranged to forward said second request to a service serving node (4) in said core network in order to enable said service serving node (4) to establish a second connection with said radio network controller (5-*j*), and ii) second forwarding means (20) arranged to receive a third request send by said broadcast multicast service server (9) and to forward said third request to said service serving node (4).

23. Telecommunication network (TN) comprising a radio access network (2) defining cells in which user equipments (7) are localized and a core network (1) linked to said radio access network and adapted to establish a multimedia broadcast multicast context for said user equipments (7) located in said cells, characterized in that it comprises at least one broadcast multicast service server (9) according to claim 13.

24. Telecommunication network (TN) according to claim 23, characterized in that said radio access network (2) comprises at least one radio network controller (5-*j*) for a radio access network (2) of a telecommunication network (TN), said radio network controller being linkable to a core network (1) of said telecommunication network (TN) adapted to establish a multimedia broadcast multicast context for user equipments (7), characterized in that it comprises:

i) first forwarding means (19) arranged to receive a second request sent by a broadcast multicast service server (9) on a first connection and arranged to forward said second request to a service serving node (4) in said core network in order to enable said service serving node (4) to establish a second connection with said radio network controller (5-*j*), and ii) second forwarding means (20) arranged to receive a third request send by said broadcast multicast service server (9) and to forward said third request to said service serving node (4).

25. Telecommunication network (TN) according to claim 24, characterized in that said broadcast multicast service server (9) is linked through a first connection to said radio network controller (5-*j*), via a cell broadcast centre (10).

26. Telecommunication network (TN) according to claim 23, characterized in that it is chosen in a group comprising GPRS network and UMTS network.

27. Use of the method, broadcast multicast service server (9), radio network controller (5-*j*) and telecommunication network (TN) according to claim 13, wherein said first connection is chosen in a group comprising TCP/IP, IPsec, UDP/IP, Transport Layer Security TLS and ATM connection.

* * * * *